United States Patent
Iyer et al.

(10) Patent No.: US 8,185,876 B2
(45) Date of Patent: May 22, 2012

(54) METHOD AND IMPLEMENTATION FOR CONSTRUCTING OF CORRECTED JAVA NATIVE CODE

(75) Inventors: Sreekanth Ramakrishna Iyer, Bangalore (IN); Flavio Alvarenga Bergamaschi, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 12/037,800

(22) Filed: Feb. 26, 2008

(65) Prior Publication Data

US 2009/0217245 A1    Aug. 27, 2009

(51) Int. Cl.
*G06F 9/44* (2006.01)
(52) U.S. Cl. ...................................... 717/126
(58) Field of Classification Search ................... 717/126, 717/118, 154
See application file for complete search history.

(56) References Cited

U.S. PATENT DOCUMENTS

| | | | |
|---|---|---|---|
| 6,066,181 A * | 5/2000 | DeMaster | 717/148 |
| 6,282,702 B1 | 8/2001 | Ungar | |
| 6,411,983 B1 * | 6/2002 | Gallop | 718/104 |
| 6,560,774 B1 * | 5/2003 | Gordon et al. | 717/146 |
| 6,662,362 B1 | 12/2003 | Sentsui et al. | |
| 6,675,371 B1 | 1/2004 | York et al. | |
| 7,150,008 B2 | 12/2006 | Cwalina et al. | |
| 7,320,129 B2 * | 1/2008 | Talwar et al. | 718/1 |
| 7,437,741 B2 * | 10/2008 | Crisan et al. | 719/330 |
| 7,543,271 B2 * | 6/2009 | Gadre | 717/116 |
| 7,870,540 B2 * | 1/2011 | Zare et al. | 717/126 |
| 2004/0068735 A1 * | 4/2004 | York et al. | 719/328 |

OTHER PUBLICATIONS

Diagnostics Guide, Version 1.4.2, Copyright IBM Corp. 2003, 2006.*
RD 452087 A Dec. 10, 2001 "Java native interface plumbing details hiding method, involves defining java native interface to be wrappered, and defining subset of Java native interface that needs to be accessed from mainline C++ code".*
Robert Wenner, JNI Testing, pp. 1-15, Robert.wenner@gmx.de, Feb. 6, 2003.
Michael Furr et al., Polymorphic Type Inference for the JNI, pp. 1-15, University of Maryland, College Park, Nov. 2005.
Florian Brandner et al., Short Presentation: Static Verification of Global Heap References in Java Native Libraries, pp. 1-6, Semantics, Program Analysis, and Computing Environments for Memory Management (SPACE), Jan. 2006, Charleston, South Carolina.
Linos et al., A Tool for Understanding Multi-language Program Dependencies, 11th IEEE International Workshop on Program Comprehension, May 10-11th 2003, Portland Oregon, USA. (http://www.iwpc2003.uvic.ca).

* cited by examiner

*Primary Examiner* — Wei Zhen
*Assistant Examiner* — Daxin Wu
(74) *Attorney, Agent, or Firm* — Cuenot, Forsythe & Kim, LLC

(57) ABSTRACT

Method and system for constructing corrected Java native code are provided. Native source code that interfaces or integrates with Java code is analyzed and validated before the source code is compiled. One or more checks are performed on the native source code to verify that the native source correctly interfaces with the Java code, and the verification results from said one or more checks are reported. The method and system for constructing corrected Java native code can be implemented as a plug-in to a program development environment, wherein a developer may invoke the method and system while developing said native source code.

12 Claims, 4 Drawing Sheets

METHOD AND IMPLEMENTATION FOR CONSTRUCTING OF CORRECTED JAVA NATIVE CODE

FIELD OF THE INVENTION

The present application relates to computer applications and more particularly to constructing of corrected Java™ native code.

BACKGROUND OF THE INVENTION

Java™ Native Interface (JNI) is a standard programming interface for writing Java native methods and embedding the Java™ virtual machine into native applications. The JNI allows Java code that runs within a Java Virtual Machine (JVM) to operate with applications and libraries written in other languages, such as C, C++, and assembly. JNI also facilitates native code access to Java VM features by calling JNI functions. Thus JNI serves as the glue between Java and Native application and is a powerful feature, which will allow programmers to take advantage of the Java Platform as well as utilize code written in other languages.

Native language implementation may be preferred in the following scenarios: support for certain platform-dependent features for which Java does not provide an interface; interface to legacy code or implementation already available; situations that require loading the native library in the same process; substitution of Java™ code with lower level code gives a better performance for any time-critical application. Programmers mostly use JNI when an application needs to incorporate certain native level implementation.

While the Java™ programming language is type-safe and secure, native languages such as C or C++ are not. As a result, extra care is needed when writing applications using the JNI. A misbehaving native method can corrupt the entire application. The JNI does very little management; it mostly provides a vehicle for the code. For a programmer, Java™ Native Interface (JNI) methods are difficult to understand and implement.

There are several things that a JNI programmer must take care to produce correct JNI code. The programmer should guard the code against the common pitfalls and traps, which can affect performance and cause runtime failures. The following are the typical traps and pitfalls associated with JNI programming:

1. Error Checking—The most common mistake when writing native methods is forgetting to check whether an error condition has occurred. Unlike the Java™ programming language, native languages do not offer standard exception mechanisms. The JNI does not rely on any particular native exception mechanism (such as C++ exceptions). As a result, programmers are required to perform explicit checks after every JNI function call that could possibly raise an exception.
2. Using Java™ Objects—Java™ objects if used as they are in the native side may produce undesirable results and also can crash the Java Virtual Machine
3. Local and Global References—There are certain considerations required when a programmer uses local or global references to make good JNI code.
4. Freeing Native Resources—Failure to call Release* methods after use of resource acquired through Get* JNI methods, results in a memory leak which could ultimately lead to memory exhaustion.
5. Explicit Return—A pending exception thrown through the JNI does not automatically change control flow in native code. Instead, the programmer needs to issue an explicit return statement in order to skip the remaining statements in the C function.
6. String Manipulation—Differences in string representation when switching between UTF-8 and Unicode strings.
7. Concurrent Programming—There are certain constraints that one must keep in mind when writing native methods that are to run in a multithreaded environment. For instance, a JNIEnv pointer is only valid in the thread associated with it. The programmer must not pass this pointer from one thread to another or cache and use it in multiple threads.

Java Virtual Machine (JVM) implementations provide certain command-line options like Xcheck:jni and Xcheck:nabounds. These options instruct the virtual machine to detect and report many, albeit not all, cases of native code passing illegal arguments to JNI functions. The tool, however, warns against invalid arguments passed to the JNI functions at compile time and at runtime. The runtime checking slows down performance drastically. The implementation of the JNI specification and the JNI command-line options differ from vendor to vendor. For instance, the implementation of Java Objects, local and global references may differ between vendors. No tools are currently available for the developer community, which perform these checks based on the JVM and the JNI implementation.

BRIEF SUMMARY OF THE INVENTION

Method and system for constructing corrected Java native code are provided. The method, in one aspect, may comprise analyzing a source file containing native source code interfacing with Java code, validating one or more inputs established in said native source code, and determining one or more checks to be performed on said native source code. Said one or more checks verify that the native source code correctly interfaces with the Java code. The method may also include performing said one or more checks and reporting one or more verification results from said one or more checks. The method is performed before said native source code is compiled for running on a processor or as a part of compiling said native source code.

A system for constructing corrected Java native code, in one aspect, may comprise a check tool operable to execute on a processor, the check tool further operable to receive a native source code interfacing with Java code and determine one or more checks to be performed. The checks verify that the native source code correctly interfaces with the Java code. The system may further include an error checker controller invoked by said check tool and the error checker controller is operable to execute on a processor and instantiate one or more error checker modules for performing said one or more checks. The system may also comprise a reporting module operable to execute on a processor and report one or more results of said one or more checks.

A program storage device readable by a machine, tangibly embodying a program of instructions executable by the machine to perform the above method steps may be also provided.

Further features as well as the structure and operation of various embodiments are described in detail below with reference to the accompanying drawings. In the drawings, like reference numbers indicate identical or functionally similar elements.

DETAILED DESCRIPTION

A method and system for constructing corrected Java™ native codes are provided. The method and system in one embodiment may include, based on the JVM implementation, statically analyzing the native code that used JNI APIs, validating the code against the JNI programming guidelines, and determining and presenting any pitfalls or traps to the developer. The method and system may be embodied as a tool that a programmer may use to discover and address many of the problems that may exist in the code at very early stage in the development cycle. The method and system provide an improvement over existing tools that detect the errors at runtime in production, which may be costly and difficult to debug.

Figure 1:
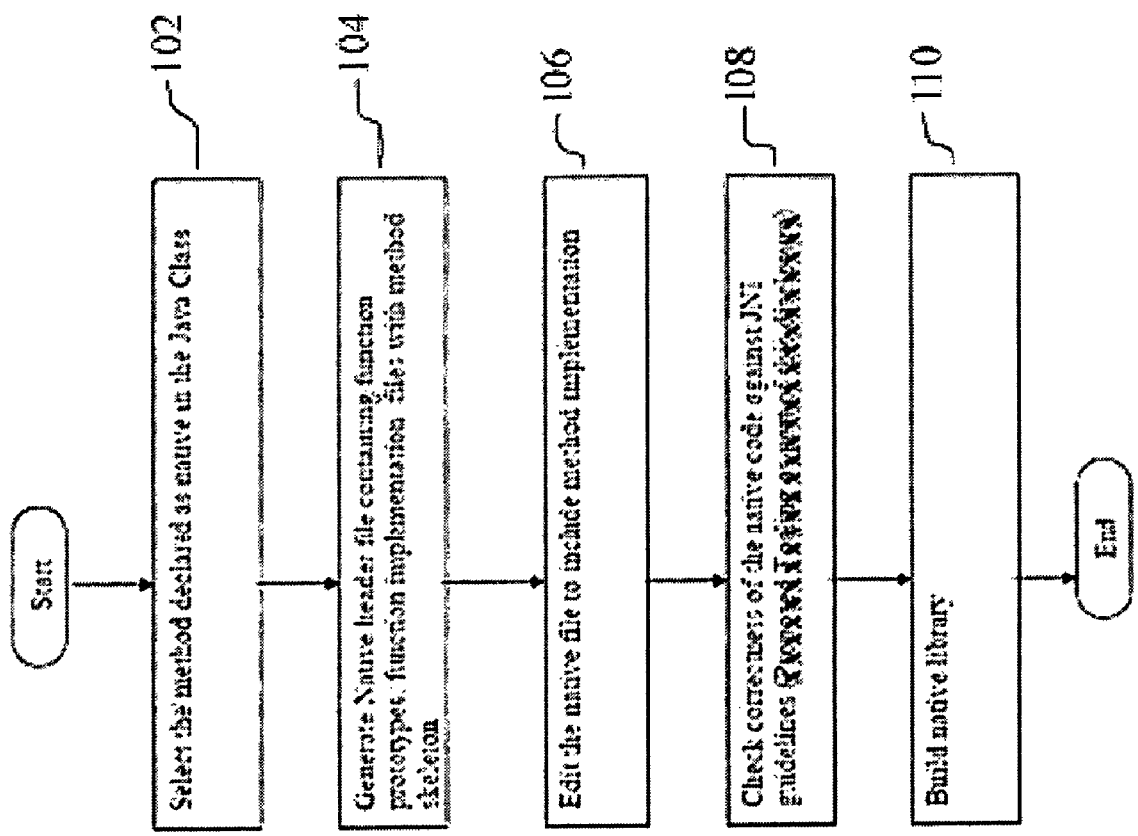
FIG. 1 is a flow diagram illustrating the steps involved for invoking native code from a java application and the present disclosure in one embodiment.

JNI can be used to call native code in a library from a Java application as well as a native application can embed a JVM and invoke implementation in java code. FIG. 1 is a flow diagram illustrating the steps involved for invoking native code from a java application and the present disclosure in one embodiment. At 102, one or more methods or procedures declared as native in the Java™ class are selected. At 104, javah (header and stub file generator) produces header files and source files for the selected methods from the Java class. The generated header file contains function prototypes and the function implementation files with method skeleton. These files provide the connective glue that allows Java and C code to interact. At 106, source file is edited to include native method implementation for the function prototype provided as output from step 104. At 108, the correctness of the native code against JNI guidelines is checked. For steps 106 and 108, a user interface (UI) of the tool of the present disclosure provides a JNI Perspective for users developing JNI Code. Based on the native language selected, a registered editor for the type of file may be used to edit the code. The tool takes the native source file as the input and generates an error-report as output depending on the checks performed on the input. The errors are flagged in the UI for the developer to take corrective action. Once the developer fixes all the errors, at 110, the native implementation is compiled and a native library is created using the native compiler on the host environment. When the Java program is executed using the java runtime interpreter, it loads the class file and the native library.

The tool embodying a method of the present disclosure in one embodiment performs the checks to avoid or mitigate the pitfalls and traps related to JNI. These checks are performed at step 108 shown in FIG. 1. The checks may verify that correct interface functions, for example, JNI interface functions, are used when communicating with peripheral devices such as a printer. The checks may to make sure that the memory used is freed up correctly after use, for instance, using the correct JNI interface functions. The checks may further include checking that one or more variables are referenced correctly, for instance, using the correct JNI interface functions.

Examples of performed checks include, but not limited to the following.

1. Printing directly of JString in the code leads to virtual machine crash. Instead developers should make use of "GetStringUTFChars" or other suitable interface functions.
2. "ReleaseStringUTFChars" interface function indicates that the native method is finished and VM can free the memory allocated with UTF-8. Failing to use this function causes a memory leak.
3. Direct addressing of the array elements is not allowed. Always make use of appropriate interface functions like "GetArraylength", "GetIntArrayElements", etc.
4. Always use appropriate Release<type>ArrayElements Interfaces, which enables the garbage collector to reclaim the memory that was earlier pinned (nonmoveable) by the arrayelements.
5. References make the java objects to be garbage collected. Local references are created by default when java object is referred in a native code. These references are made invalid after a return from the native code. Trying to store or cache a local reference to reuse it for future invocations will give rise to an error as the local reference that is cached is not correct. Developers need to be guided on the proper usage of Global and Local references based on the code.
6. Global Reference keeps VM to unload a class loader thereby making member identifier valid always. So, in implementation of global reference always make use of "DeleteGlobalRef" to unload a class loader or else the class loader will never be unloaded.
7. In most cases the garbage collector frees the local references automatically after a return is made from the native code. Use "DeleteLocalRef" where explicitly deleting a local reference is required to avoid unnecessary waiting, e.g., in lengthy computation.
8. An interface pointer is only valid for a current thread. So, it should not be cached and used in other threads.
9. In threads proper locking mechanisms should be implemented to access of global variables, e.g., use of Monitors.
10. Never have a local reference from one thread to another thread. It is very much possible that before a thread uses the local reference that was used by some other thread it may become invalid.
11. Attaching of threads refer to attaching of native threads to java threads. Attaching of native threads depends on the platform, e.g., attaching of threads is not supported on Solaris™.
12. While embedding VM into native applications no automatic return to VM is made. So, explicit return of local references needs to be made by making use of "DestroyJavaVM" or "DetachThreads".
13. Never pass null or invalid arguments. If a program passes a null or any invalid argument where the JNI interface function expects a reference, it will result in ambiguous behavior or VM crash.
14. Avoid using local references excessively as it unnecessarily wastes memory. Developer needs to be warned about the excessive usage of local references.
15. Unicode strings that are obtained using interface functions like "GetStringChars" are not null terminated. To make it null terminated get the string length from "GetStringLength" interface function and depending on the OS terminate the string, e.g., Windows NT™ expects two trailing zero bytes values to terminate the string.
16. Translate the Java VM specified Unicode strings that is the JString to appropriate local specific native string using "JNU_GetStringNativeChars" to avoid disregarding of internationalization. For instance, while a native method gets a file name from, the Unicode string in JString must be translated to a native string before passing to a C library. In such case, the File names or message strings involve internationalization.

17. Never confuse with JClass and JObject. JObject is always associated with instance operations like string, arrays, etc. and jclass is associated with class operations like "GetIntField", etc. Incorrect usage of JClass and JObject to be detected and avoided.

18. IDs and References are different. Objects are References and IDs are Methods and Fields are Ids. References can be explicitly freed by the native code but IDs are only deleted automatically by VM when a return happens from a native method.

Figure 2:
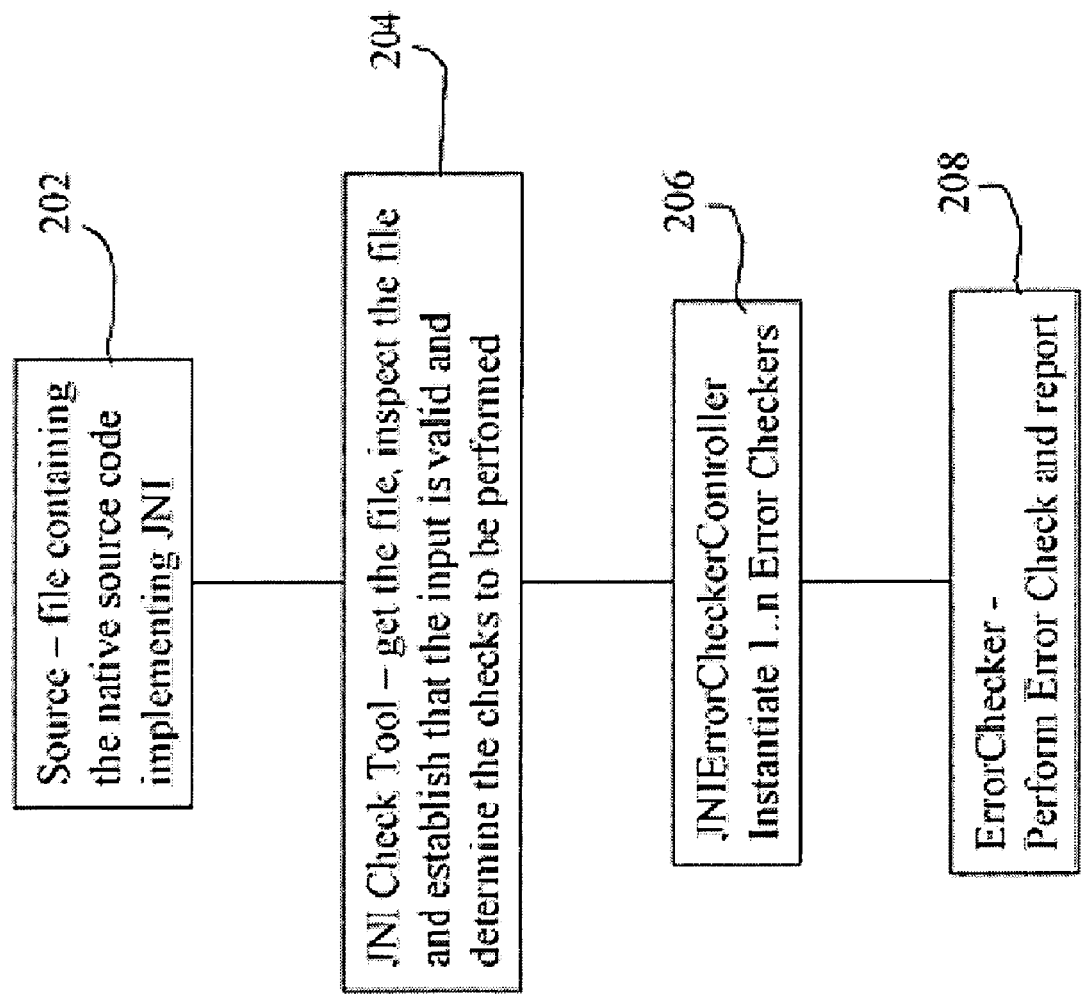
FIG. 2 illustrates components and steps performed for error checking in one embodiment of the present disclosure.

The tool embodying the method of the present disclosure in one embodiment critically examines the code to avoid the above pitfalls and traps in JNI that can lead to serious problems including virtual machine crash. FIG. 2 illustrates components and steps performed for error checking in one embodiment of the present disclosure. As shown in FIG. 2, the tool starts with verification of the given file 202. JNI Check Tool of the present disclosure 204 establishes that it is a valid JNI source file, and based on the validity and the type of source code, it determines the type of checks to be performed. The set of error checks that needs to be performed is determined based on the source file type and the user preferences. JNIErrorCheckController 206 of the present disclosure instantiates 1 . . . n error checkers. Instantiated error checkers 208 then perform error checks and performs reporting function.

Figure 3:
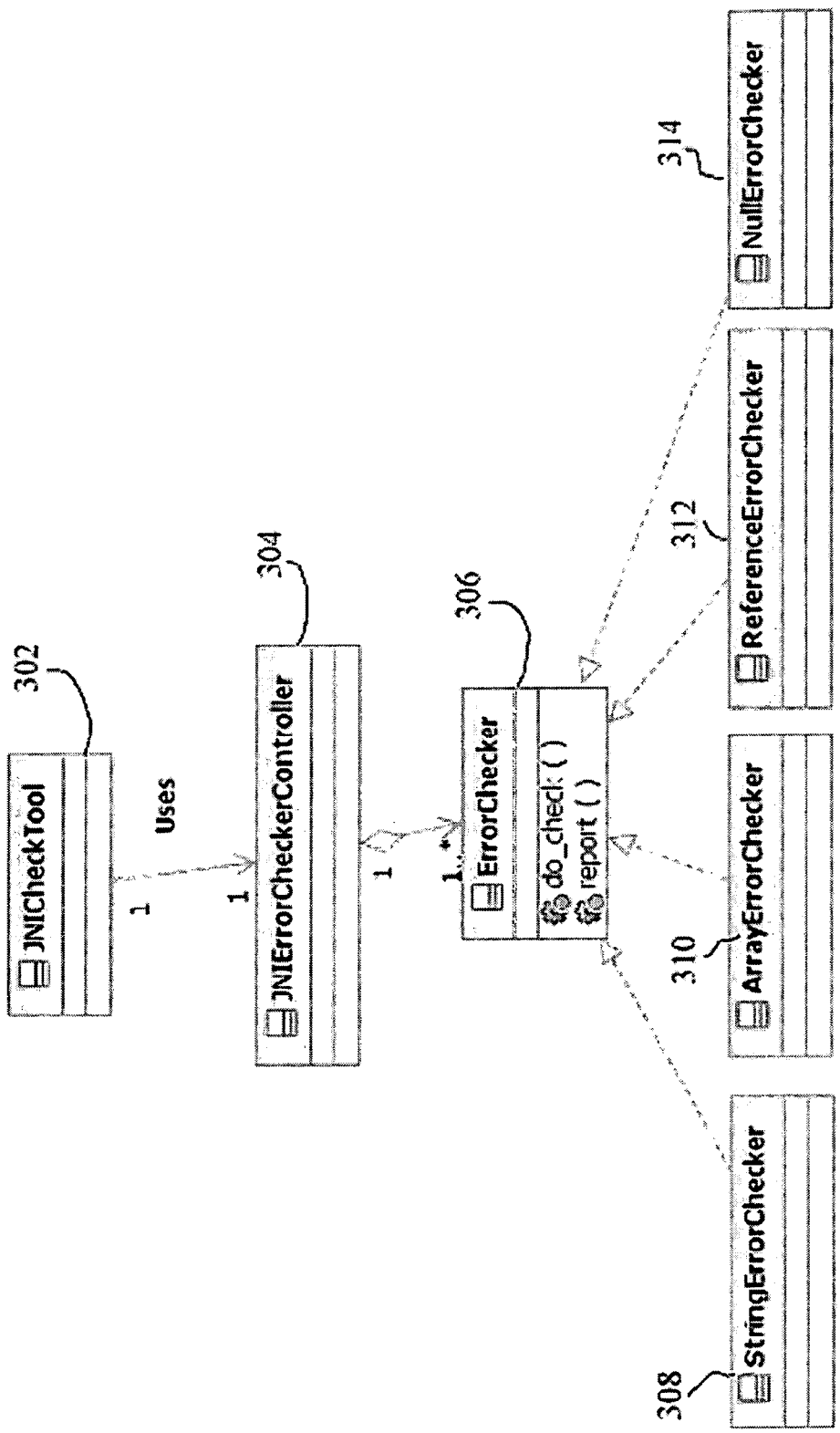
FIG. 3 further illustrates the components and steps performed for error checking.

FIG. 3 further illustrates the components and steps performed for error checking. JNICheckTool 302 uses JNIErrorCheckController 304, which instantiates specific error checkers 306. Each ErrorChecker 306 implements the "do_check( )" and "reports" methods. For instance, the StringErrorChecker class 308 that is created reports errors related to String manipulations in native code while ArrayErrorChecker 310 report errors (if any) related to use of arrays in native code. ReferenceErrorChecker 312 reports errors related to referencing use, and NullErrorChecker 314 reports errors on null values. The "JNIErrorCheckerController" class 304 creates, manages and invokes these error-checker functionalities 308-314 based on the need and receives the report from each ErrorChecker 306 as the output. Based on the report, the method and system of the present disclosure or the tool embodying the same provide the developer feedback on the code as errors, warnings and information. Thus, the problems can be addressed very early in the development cycle and will not result in any runtime failures.

In one embodiment, the tool embodying the method of the present disclosure may be implemented as a plugin to a development environment such as Eclipse. The tool enables the developer, at any time during editing of a native file involving a JNI implementation, to make use of a menu or icon to initiate the JNI checker tool. Once the checks are completed they are displayed to the user as errors, warnings or information based, for example, on the severity of the errors. While the present disclosure was described in terms of JNI checks on native methods invoked from a Java application, the method of the present disclosure may also be used to validate the native method that invokes Java code. For instance, the method may be embodied in a tool which can be used as a plugin to interact with Java™ development environments such as the JDT (Java Development Toolkit).

Figure 4:
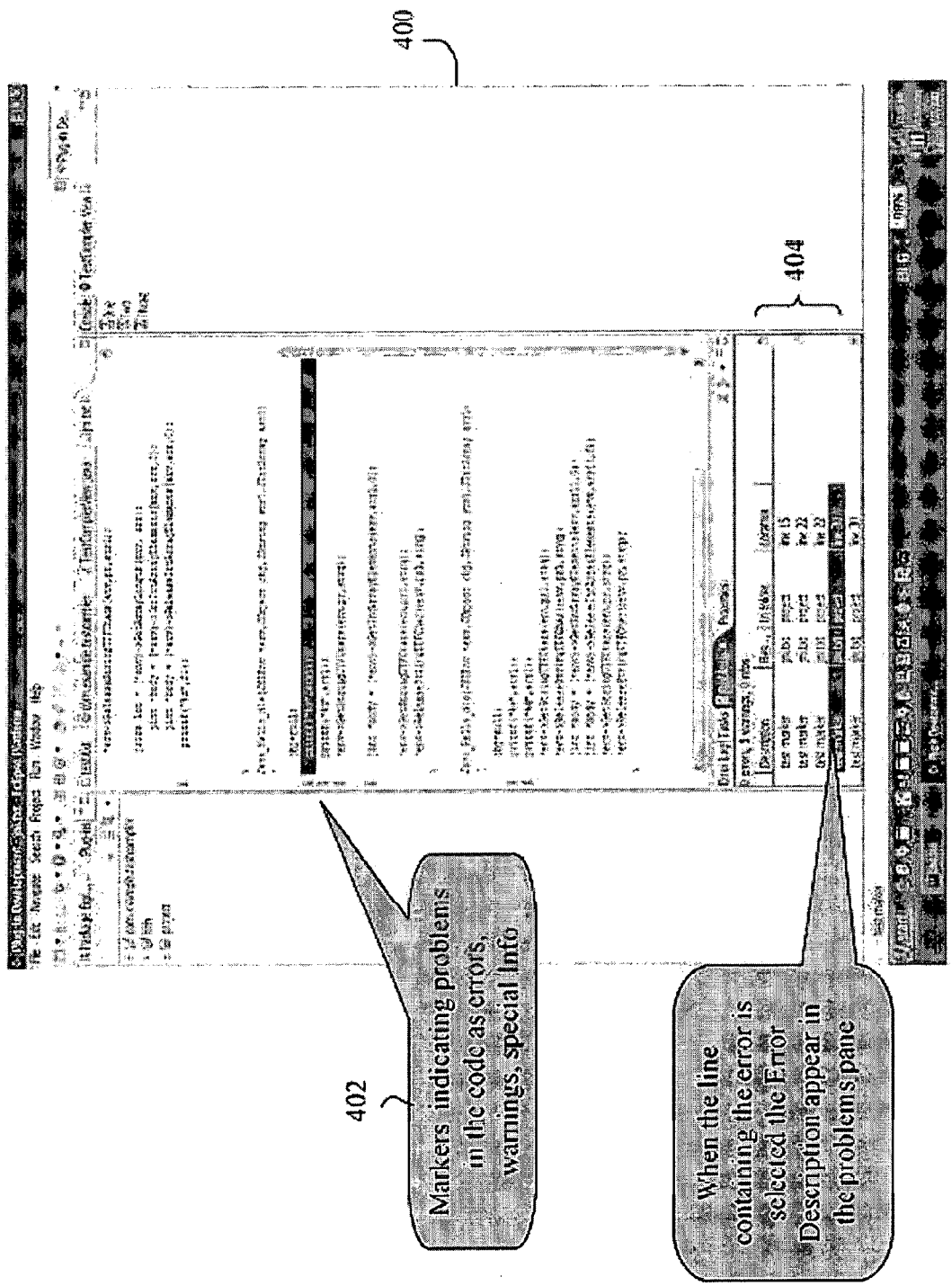
FIG. 4 is an example of a screen snapshot of a development environment providing the method of the present disclosure, for instance, as a plugin.

FIG. 4 is an example of a screen snapshot 400 of a development environment providing the method of the present disclosure, for instance, as a plugin. FIG. 4 shows the tool embodying a method of the present disclosure integrated as an Eclipse™ Plugin. The tool provides markers 402, which denote error in the code based on the report provided by the ErrorCheckers. When the line containing the error is selected the error description appears in the Problems pane 404.

Debugging a runtime failure involving native libraries can be tedious and difficult. It is even more complicated if the native library is a third party library and if tracing in that third party library code is not enabled. The method and system of the present application in one embodiment may prevent such run time failures or difficulties involved in debugging the failed code.

A tool embodying the method and/or system of the present disclosure may be delivered as a plugin, for example, to the Eclipse platform, which is becoming the preferred IDE (integrated development environment) by developers of Java™ Community. The tool may provide user friendly and improved exploitation of the JNI features, correctness of the code, and reduced runtime failures related incorrect JNI usage. The programmer need not worry about the steps involved and generation of glue code to get native code bind to the JNI interface. The tool may also keep the interest of programmers inclined to traditional languages such as C, C++ at the same time making integration of their work with Java easy and error free.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of constructing corrected Java native code, comprising:
    analyzing a source file containing native source code interfacing with Java code;
    validating one or more inputs established in said native source code;
    selecting, based upon the validating of said native source code and a type of said native source code, one or more checks to be performed on said native source code, said one or more checks verifying said native source code correctly interfaces with said Java code;
    performing said one or more checks;

generating an error report containing one or more verification results from said one or more checks, said method being performed before said native source code is compiled for running on a processor.

2. The method of claim 1, wherein said source file is implementing JNI.

3. The method of claim 1, wherein said one or more verification results are used by a programmer to correct said native source code.

4. The method of claim 1, wherein said method is invoked via a user interface.

5. The method of claim 1, wherein said method is implemented as a plug-in to a development environment system.

6. The method of claim 1, wherein said one or more checks include a check that validates correct use of one or more pre-established interface functions for interfacing with one or more peripheral devices.

7. The method of claim 1, wherein said one or more checks include validating correct interface function is used to free memory.

8. The method of claim 1, wherein said one or more checks include checking that one or more variables, threads, or both are referenced correctly.

9. The method of claim 1, wherein said one or more checks include validating that one or more threads correctly use locking mechanism.

10. The method of claim 1, wherein said one or more checks include checking that no null or invalid arguments are passed to interface functions.

11. The method of claim 1, wherein said one or more checks include verifying correct use of classes and objects.

12. The method of claim 1, further including:
    verifying that said source code is a valid JNI source file, before the steps of determining and performing.

* * * * *